US011458582B2

(12) United States Patent
Ortt (10) Patent No.: US 11,458,582 B2
(45) Date of Patent: Oct. 4, 2022

(54) LEAD BOARD REMOVER

(71) Applicant: Millwood, Inc., Vienna, OH (US)

(72) Inventor: George Ortt, Vienna, OH (US)

(73) Assignee: Millwood, Inc., Vienna, OH (US)

( * ) Notice: Subject to any disclaimer, the term of this patent is extended or adjusted under 35 U.S.C. 154(b) by 382 days.

(21) Appl. No.: 16/196,013

(22) Filed: Nov. 20, 2018

(65) Prior Publication Data

US 2019/0299348 A1 Oct. 3, 2019

Related U.S. Application Data

(60) Provisional application No. 62/651,773, filed on Apr. 3, 2018.

(51) Int. Cl.
*B23Q 7/14* (2006.01)
*B23P 19/04* (2006.01)

(52) U.S. Cl.
CPC .......... *B23Q 7/1431* (2013.01); *B23P 19/041* (2013.01)

(58) Field of Classification Search
CPC ..... B23P 19/041; B23P 19/027; B23P 19/025; B23P 19/04; B23Q 7/1431; B23Q 7/14; B23Q 7/1426; B23Q 3/02; B23Q 3/06; B23Q 3/064; Y10T 29/5383; Y10T 29/53896; Y10T 29/53683; Y10T 29/53796
USPC .................................................... 29/239, 244
See application file for complete search history.

(56) References Cited

U.S. PATENT DOCUMENTS

| 4,285,110 | A | * | 8/1981 | Fagre, Jr. | ............... | B23P 19/041 29/252 |
| 5,423,114 | A | * | 6/1995 | Johnson | ................ | B23P 19/041 254/131 |
| 5,467,516 | A | * | 11/1995 | DeGeorge | ............ | B23P 19/041 29/239 |
| 5,848,459 | A | * | 12/1998 | Minick | ................ | B23P 19/041 29/426.5 |

OTHER PUBLICATIONS

Custom and Recycyle Pallet, Pallet Types and Sizes, Jan. 6, 2017, https://customrecyclepallet.com/pallet-types-sizes/, premium grade 1 (Year: 2017).*

* cited by examiner

*Primary Examiner* — Lee D Wilson
*Assistant Examiner* — Robert F Neibaur
(74) *Attorney, Agent, or Firm* — Sand, Sebolt & Wernow Co., LPA (57) ABSTRACT

A removal tool including a frame having a first side and a second side defining a longitudinal direction therebetween and a first end and a second end defining a transverse direction therebetween, a pivotable separating mechanism and a stopping mechanism is disclosed. The removal tool may be adapted to remove a portion of a pallet. The pivotable separating mechanism may include a first position and a second position. When the pivotable separating mechanism is moved from the first position to the second position the pivotable separating mechanism is adjusted from a first angle relative to the ground to a second angle relative to the ground. The second angle may be greater than the first angle.

11 Claims, 11 Drawing Sheets

LEAD BOARD REMOVER

CROSS REFERENCE TO RELATED APPLICATION

The present application claims the benefit of U.S. Provisional Patent Application Ser. No. 62/651,773, filed Apr. 3, 2018; the disclosure of which is entirely incorporated herein by reference.

BACKGROUND

Technical Field

The present disclosure relates generally to the field of utility tools. More particularly, the present disclosure relates to a removal tool. Specifically, the present disclosure relates to a removal tool for removing a portion of a pallet.

Background Information

Generally, a pallet is a flat transport structure that supports various goods. Typically, pallets are made out of wood and include stringers or blocks that support several deckboards which are configured to support the goods.

Often times, goods supported by pallets need to be transported from one location to another. There are many methods of transporting pallets, such as, for example, utilizing forklifts to lift and move the pallets to a desired location. To facilitate transport, pallets typically include openings between the deckboards and between the stringers or blocks which allow the pallets to be transported via the forks of the forklift. One drawback associated with using forklifts to transport pallets is that the forklifts sometimes damage the pallets. For example, forks of the forklift may make contact with the lead board of the pallet causing damage to the lead board.

When a lead board is damaged, it typically needs to be replaced; however, removing the damaged lead board from the pallet is often a difficult task. One conventional method includes utilizing a flat plate to lift up on the lead board; however, drawbacks of this method include ineffectively applying pressure to the lead board and the pallet falling off of the flat plate. Another conventional method includes manually removing the board by hammering a pry bar under the edges of the board until the fasteners become loose, and then pulling the board from the stringers or blocks. As one can imagine, this is typically a difficult task to perform.

SUMMARY

A need continues to exist for removal tools. The removal tool of the present disclosure addresses the shortcomings of previously known removal tools.

In one aspect, the present disclosure may provide a removal tool comprising a frame including a first side and a second side defining a longitudinal direction therebetween and a first end and a second end defining a transverse direction therebetween, a pivotable separating mechanism and a stopping mechanism. The removal tool may be adapted to remove a portion of a pallet.

The pivotable separating mechanism may include a pivot shaft. The removal tool may include at least one separating device connected to the pivot shaft. The pivot shaft may include an inner portion between the first side and the second side of the frame. The removal tool may further include a vertical plane extending through the center of the inner portion. The removal tool may include a first separating device, a second separating device, a third separating device, and a fourth separating device.

The first separating device may be spaced a first distance from the vertical plane, the second separating device may be spaced a second distance from the vertical plane, the third separating device may be spaced a third distance from the vertical plane, and the fourth separating device may be spaced a fourth distance from the vertical plane. The first distance may be approximately equal to the fourth distance, the second distance may be approximately equal to the third distance, and the first distance and the fourth distance may be greater than the second distance and the third distance.

Each of the at least one separating device may further include an inner surface defining a cavity. The cavity may be adapted to receive the portion of the pallet. The cavity may be substantially U-shaped.

The removal tool may further include a drive mechanism operatively connected to the pivotable separating mechanism.

The pivotable separating mechanism may include a first position and a second position. When the pivotable separating mechanism is moved from the first position to the second position the pivotable separating mechanism is adjusted from a first angle relative to the ground to a second angle relative to the ground. The second angle may be greater than the first angle.

In another aspect, the present disclosure may provide a removal tool including a frame having a first side and a second side defining a longitudinal direction therebetween and a first end and a second end defining a transverse direction therebetween, a pivotable separating mechanism and a stopping mechanism. The removal tool may be adapted to remove a portion of a pallet. The pivotable separating mechanism may include a first position and a second position. When the pivotable separating mechanism is moved from the first position to the second position the pivotable separating mechanism is adjusted from a first angle relative to the ground to a second angle relative to the ground. The second angle may be greater than the first angle.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Referring to FIG. 1-FIG. 3 and FIG. 5-FIG. 6E, there is shown a removal tool in accordance with one aspect of the present disclosure, with the removal tool generally indicated at 10.

Figure 1:
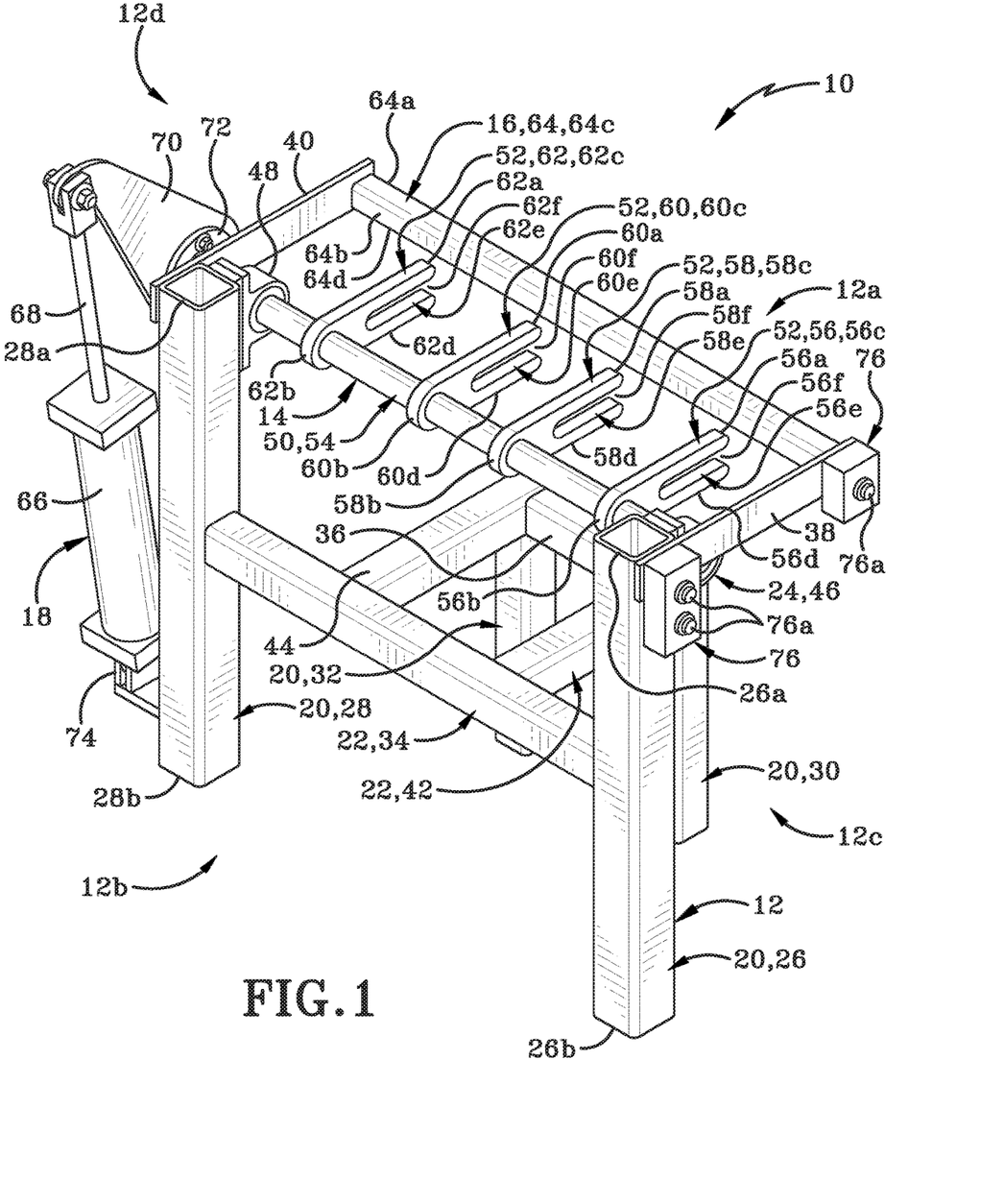
FIG. 1 is an isometric perspective view of a removal tool in accordance with one aspect of the present disclosure.
Figure 2:
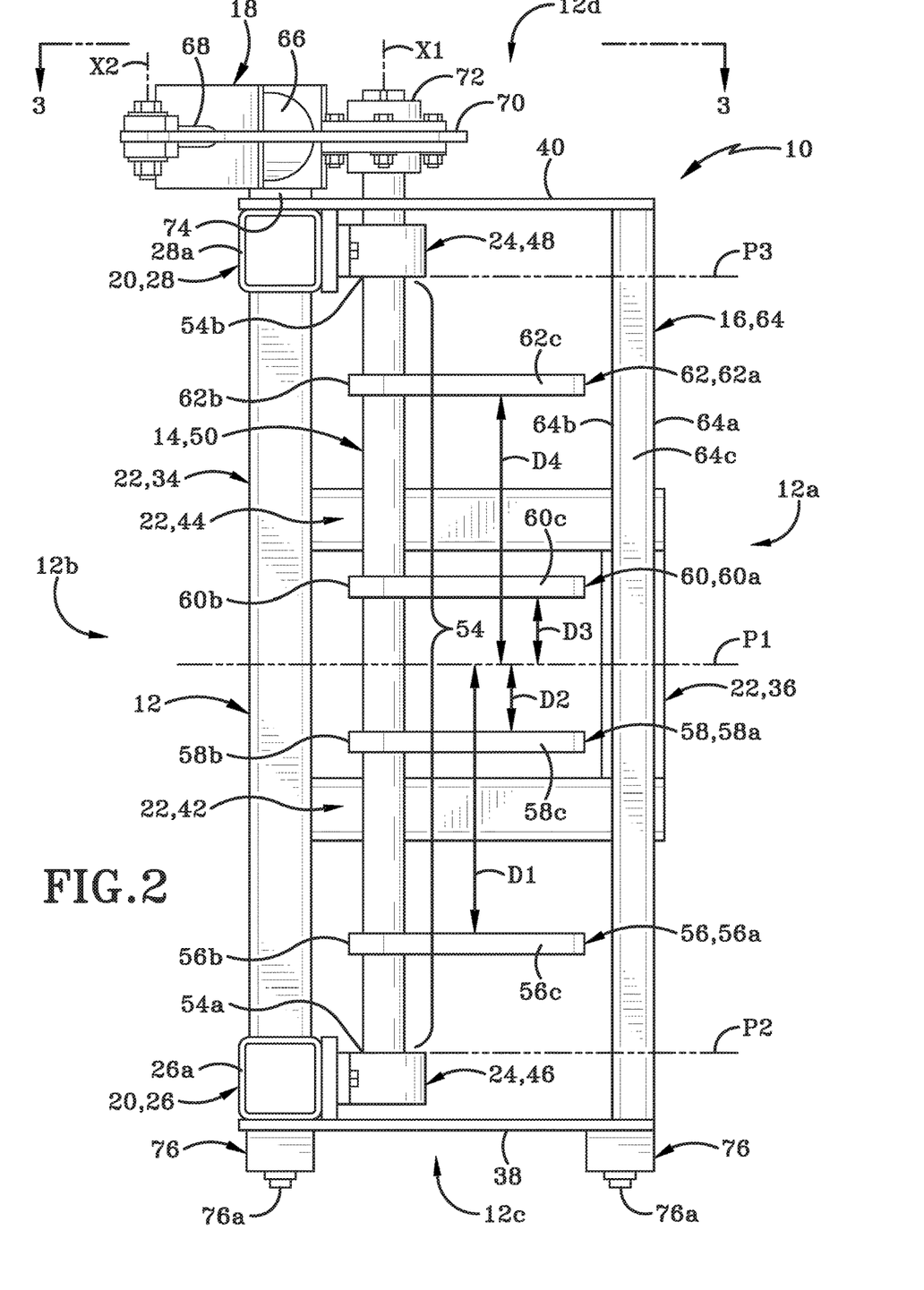
FIG. 2 is top plan view of the removal tool of FIG. 1.
Figure 3:
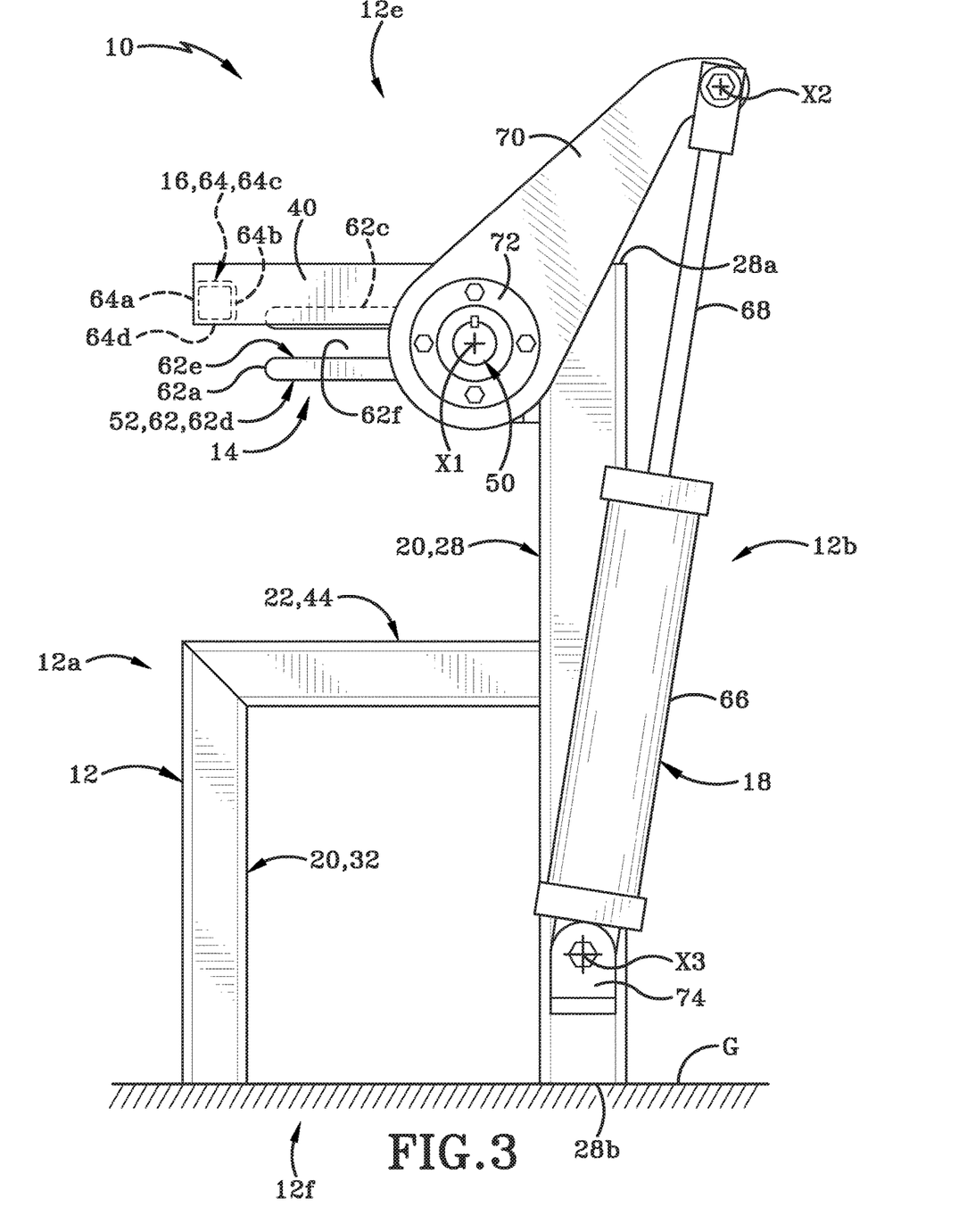
FIG. 3 is a side view of the removal tool taken along line 3-3 of FIG. 2.

The removal tool 10 may include a frame 12, a pivotable separating mechanism 14, a stopping mechanism 16, and a drive mechanism 18. The pivotable separating mechanism 14, the stopping mechanism 16 and the drive mechanism 18 may be carried by the frame 12 as more fully described below.

The frame 12 may include a front end 12a and a rear end 12b defining a transverse direction therebetween, a first side 12c and a second side 12d defining a longitudinal direction therebetween and a top end 12e and a bottom end 12f defining a vertical direction therebetween. The frame 12 may further include a plurality of support legs 20, a plurality of support members 22, and a plurality of mounting brackets 24.

With primary reference to FIG. 1, and in one particular embodiment, the frame 12 may include a vertically extending first support leg 26, a vertically extending second support leg 28, a vertically extending third support leg 30, a vertically extending fourth support leg 32, a longitudinally extending first support member 34, a longitudinally extending second support member 36, a transversely extending third support member 38, a transversely extending fourth support member 40, a transversely extending fifth support member 42, a transversely extending sixth support member 44, a first mounting bracket 46 and a second mounting bracket 48. In one example, the first support leg 26, the second support leg 28, the third support leg 30, and the fourth support leg 32 may be height adjustable; however, the first support leg 26, the second support leg 28, the third support leg 30 and the fourth support leg 32 may also be configured to have fixed lengths.

With primary reference to FIG. 1, FIG. 2 and FIG. 3, the first support leg 26 may include a top end 26a and a bottom end 26b. The second support leg 28 may include a top end 28a and a bottom end 28b. The first support member 34 may be fixedly secured to the first support leg 26 and the second support leg 28 approximately midway between the top ends 26a and 28a and the bottom ends 26b and 28b.

The second support member 36 may be spaced apart from and generally parallel with the first support member 34 and may be fixedly secured to the third support leg 30, the fourth support leg 32, the fifth support member 42, and the sixth support member 44. In one example, a length of the second support member 36 is less than a length of the first support member 34. In one example, a length of the third support leg 30 and the fourth support leg 32 is less than a length of the first support leg 26 and the second support leg 28. In one example, a longitudinal distance between the third support leg 30 and the fourth support leg 32 is less than a longitudinal distance between of the first support leg 26 and the second support leg 28. In one example, a top surface of the first support member 34, the second support member 36, the fifth support member 42 and the sixth support member 44 are generally flush with one another.

The third support member 38 may be spaced apart from and generally parallel with the fourth support member 40 and may be fixedly secured to the first support leg 26 near the top end 26a of the first support leg 26. The fourth support member 40 may be spaced apart from and generally parallel with the third support member 38 and may be fixedly secured to the second support leg 28 near the top end 28a of the second support leg 28.

The fifth support member 42 may be spaced apart from and generally parallel to the sixth support member 44 and may be may be fixedly secured to the first support member 34 and the second support member 36. In one example, the fifth support member 42 is connected to the first support member 34 closer to the first support leg 26 than the second support leg 28. The sixth support member 44 may be spaced apart from and generally parallel to the fifth support member 42 and may be may be fixedly secured to the first support member 34 and the second support member 36. In one example, the sixth support member 44 is connected to the first support member 34 closer to the second support leg 28 than the first support leg 26.

The first mounting bracket 46 may be spaced apart from and generally parallel with the second mounting bracket 48 and may be fixedly secured to the first support leg 26 near the top end 26a of the first support leg 26. The second mounting bracket 48 may be spaced apart from and generally parallel with the first mounting bracket 46 and may be fixedly secured to the second support leg 28 near the top end 28a of the second support leg 28.

It is envisioned that the various components of the frame 12 may be connected via welding; however, it is to be understood that the various components of the frame 12 may be connected in any suitable manner, such as, for example, being integrally formed.

With continued reference to FIG. 1, FIG. 2 and FIG. 3, and in one particular embodiment, the pivotable separating mechanism 14 may include a longitudinally extending pivot shaft 50 and at least one transversely extending separating device 52 connected to the pivot shaft 50.

A bearing assembly (not shown) of the first and second mounting brackets, 46 and 48, may support the pivot shaft 50. The pivot shaft 50 may include an inner portion 54 (FIG. 2) extending between the first and second mounting brackets 46 and 48. The inner portion 54 may include a first end 54a and a second end 54b. The pivot shaft 50 may rotate about a first horizontal longitudinally extending pivot axis X1 via a free rotational connection with the bearing assemblies of the first and second mounting brackets 46 and 48.

With primary reference to FIG. 3, and in one particular embodiment, the removal tool 10 may include a first imaginary vertical plane P1 extending transversely through the center of the inner portion 54 of the pivot shaft 50, a second imaginary vertical plane P2 extending transversely through the first end 54a of the inner portion 54 of the pivot shaft 50, and a third vertical plane P3 extending transversely through the second end 54b of the inner portion 54 of the pivot shaft 50.

In one particular embodiment, the removal tool 10 may include a first separating device 56, a second separating device 58, a third separating device 60, and a fourth separating device 62. In one example, each separating device 56, 58, 60, and 62, may be shaped like a tuning fork that defines an open slot that receives a lead deckboard of a pallet therein as more fully described below. The size of the slot may be complementary to the size of the lead deckboard.

More specifically, the first separating device 56 may include a front end 56a, a rear end 56b, a top surface 56c, a bottom surface 56d, and an inner surface 56e. The inner surface 56e may define an open ended cavity 56f. The cavity 56f may be generally U-shaped; however, the cavity 56f may be any suitable shape.

The second separating device 58 may include a front end 58a, a rear end 58b, a top surface 58c, a bottom surface 58d, and an inner surface 58e. The inner surface 58e may define an open ended cavity 58f. The cavity 58f may be generally U-shaped; however, the cavity 56f may be any suitable shape.

The third separating device 60 may include a front end 60a, a rear end 60b, a top surface 60c, a bottom surface 60d, and an inner surface 60e. The inner surface 60e may define an open ended cavity 60f. The cavity 60f may be generally U-shaped; however, the cavity 60f may be any suitable shape.

The fourth separating device 62 may include a front end 62a, a rear end 62b, a top surface 62c, a bottom surface 62d, and an inner surface 62e. The inner surface 62e may define an open ended cavity 62f. The cavity 62f may be generally U-shaped; however, the cavity 62f may be any suitable shape.

The first separating device 56, the second separating device 58, the third separating device 60 and the fourth separating device 62 may extend in a transverse direction away from the pivot shaft 50. The first separating device 56, the second separating device 58, the third separating device 60 and the fourth separating device 62 may be generally parallel to one another and longitudinally spaced from one another as more fully described below.

The first separating device 56 may be positioned a first distance D1 from the first plane P1. The second separating device 58 may be positioned a second distance D2 from the first plane P1. The third separating device 60 may be positioned a third distance D3 from the first plane P1. The fourth separating device 62 may be positioned a fourth distance D4 from the first plane P1.

In one example, the first distance D1 and the fourth distance D4 are equal, the second distance D2 and the third distance D3 are equal, and the first distance D1 and the fourth distance D4 are greater than the second distance D2 and the third distance D3; however, the first distance D1, the second distance D2, the third distance D3, and the fourth distance D4 may be any suitable distances.

In one particular embodiment, the stopping mechanism 16 may be a longitudinally extending elongated stopping member 64 fixedly secured to the third support member 38 and the fourth support member 40 near the front end 12a of the frame 12. The stopping member 64 may include a front surface 64a, a rear surface 64b, a top surface 64c, and a bottom surface 64d.

Figure 6A:
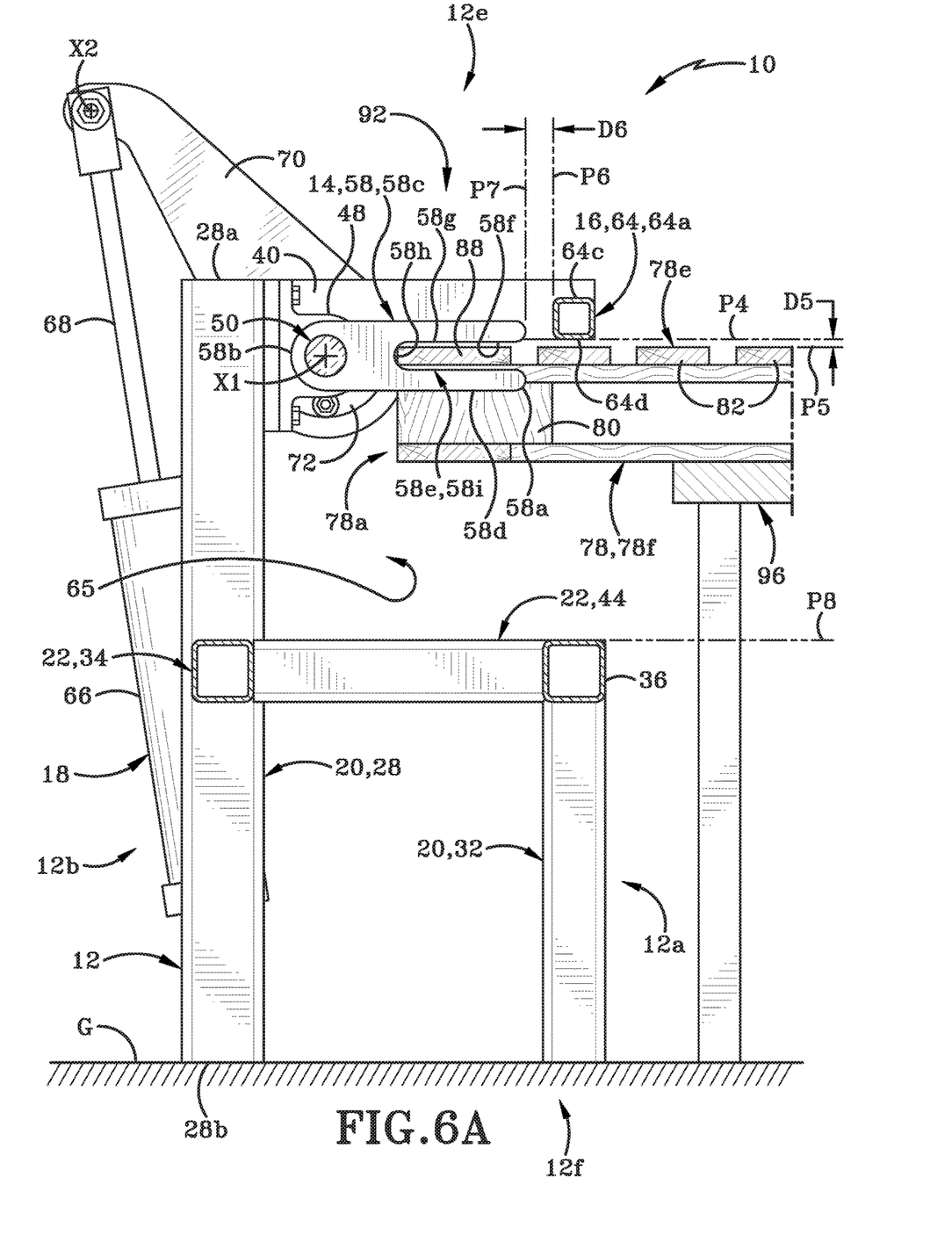
FIG. 6A is a cross section view taken along line 6A-6A of FIG. 5.

With reference to FIG. 6A, and in one example, the bottom surface 64d of the stopping member 64 may define a fourth imaginary horizontal plane P4. Although the first separating device 56, the second separating device 58, the third separating device 60 and the fourth separating device 62 are substantially identical, only the characteristics of the second separating device 58 will be more fully described herein for brevity purposes. Specifically, and in one example, the inner surface 58e may further include a top inner portion 58g, an intermediate inner portion 58h and a bottom inner portion 58i.

In one example, the top inner portion 58g may be spaced a distance that is greater than approximately five sixteenths of an inch from the bottom inner portion 58i; however, the distance may be any suitable distance. In one example, the intermediate inner portion 58h may be spaced a distance of at least approximately three and one half inches from the open end of the cavity 58f; however, the distance may be any suitable distance. The top inner portion 58g may define a fifth imaginary horizontal plane P5. The fourth plane P4 may be positioned a fifth distance D5 above the fifth plane P5. In one example, the fifth distance D5 may be less than approximately one inch; however, the fifth distance D5 may be any suitable distance. In other words, the cavities 56f, 58f, 60f, and 62f are located vertically below the bottom surface 64d of the stopping member 64 before the pivot shaft 50 rotates the cavities 56f, 58f, 60f, and 62f about the pivot axis X1 as more fully described below.

With reference to FIG. 6A, and in one example, the rear surface 64b may define a sixth imaginary horizontal plane P6. In one example, the front end 58a of the second pivotable separating device 58 may define a seventh vertical plane P7. The sixth plane P6 may be spaced a sixth distance D6 from the seventh plane P7. In one example, the sixth distance D6 is less than approximately four inches; however, the sixth distance D6 may be nay suitable distance.

With continued reference to FIG. 6A, and in one example, the removal tool 10 may include an eighth horizontal plane P8 extending midway the top end 12e and the bottom end 12f of the frame 12. The removal tool 10 may include a free space 65 located vertically below the pivotable separating mechanism 14 and vertically above the eighth plane P8. The free space 65 may also be located vertically below the pivotable separating mechanism 14 and vertically above at least one support member 22 of the frame 12. The free space 65 may also be located vertically below the pivotable separating mechanism 14 and vertically above the at least one support leg 20 of the frame 12.

In one particular embodiment, the drive mechanism 18 may include a pneumatic cylinder 66, a piston rod 68, a link member 70, a first mounting device 72 and a second mounting device 74. The pneumatic cylinder 66 may be pivotably connected to the second support leg 28 of the frame 12 via the first mounting device 72. The pneumatic cylinder 66 may enclose the piston rod 68 and the piston rod 68 may be pivotally connected to the link member 70. The link member 70 may be pivotably connected to the pivot shaft 50 via the second mounting device 74. The link member 70 and the pivot shaft 50 are rotatable about the first pivot axis X1. The link member 70 and the piston rod 68 are pivotable about a second pivot axis X2. The piston rod and pneumatic cylinder 66 may be pivotable about a third axis X3 (FIG. 3). Although a particular drive mechanism 18 has been described, it is envisioned that any suitable drive mechanism may be utilized. Although the drive mechanism 18 has been described as being connected to the second support leg 28, it is understood that the drive mechanism 18 may instead be connected to the first support leg 26 in a similar manner.

In one particular embodiment, the removal tool 10 may further include a control mechanism 76 carried by the frame 12. The control mechanism 76 may be in electrical communication with a conventional alternating current (AC) electrical outlet (not shown) and operatively connected to the pneumatic cylinder 66 of the drive mechanism 18 via fluid conduits (not shown). The control mechanism 76 may include a plurality of control actuators 76a which may provide power to and operate the pneumatic cylinder 66. It is also envisioned that the removal tool 10 may be manually operated instead of utilizing the drive mechanism 18, such as, for example, utilizing a lever to pivot the pivot shaft 50 in a desired direction.

Figure 4:
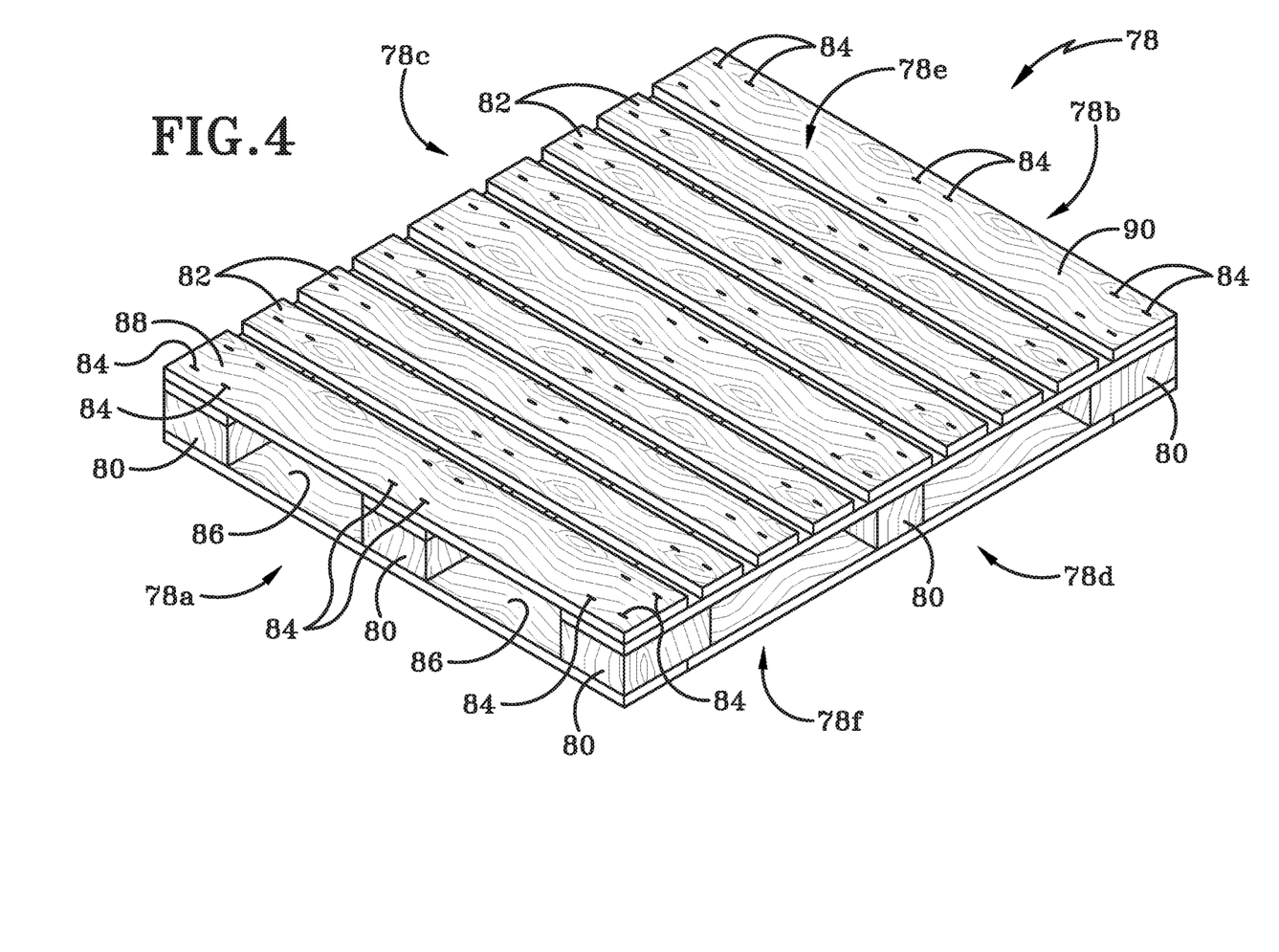
FIG. 4 is an isometric perspective of a conventional pallet having deckboards supported by blocks.
Figure 5:
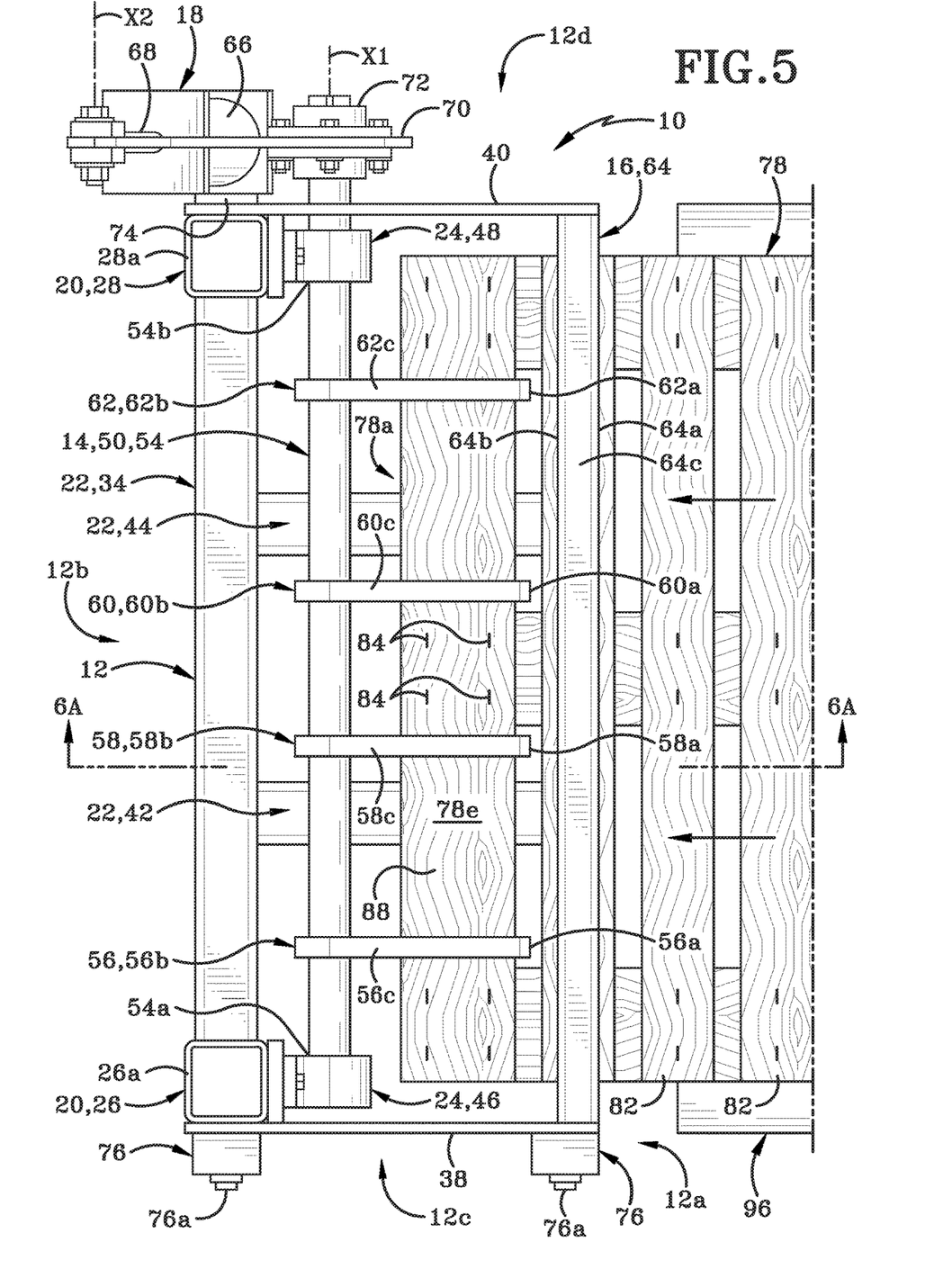
FIG. 5 is a top plan view of the removal tool of FIG. 1 engaging the conventional pallet.

In one particular embodiment, the removal tool 10 may be utilized with a conventional pallet 78. With reference to FIG. 4, the pallet 78 may include a front end 78a, a rear end 78b, a first side 78c, a second side 78d, a top end 78e, and a bottom end 78f. The front end 78a and the rear end 78b may define a transverse direction therebetween, the first side 78c and the second side 78d may define a longitudinal direction therebetween, and the top end 78e and the bottom end 78f may define a vertical direction therebetween. The pallet 78 may include a plurality of blocks 80 and a plurality of transversely extending deckboards 82 above and below the blocks 80. The plurality of deckboards 82 may be connected to the plurality of blocks 80 via fasteners 84. The pallet 78 may further include openings 86 defined by the plurality of blocks 80 and the plurality of deckboards 82. The pallet 78 may further include a first lead deckboard 88 and second lead deckboard 90. The first lead deckboard 88 may be positioned proximate the front end 78a and the second lead deckboard 90 may be positioned proximate the rear end 78b.

With reference to FIG. 5 and FIG. 6A through FIG. 6E, and in operation, the removal tool 10 may be utilized to remove the first lead deckboard 88 and the second lead deckboard 90 from the pallet 78. In one example, the pallet 78 may be positioned on a platform 96, such as a table, proximate the front end 12a of the frame 12. In one example, the height of the removal tool 10 may be adjusted, via the adjustable support legs 26, 28, 30, and 32, so that the first lead deckboard 88 and the second lead deckboard 90 are generally aligned to be received within the cavities 56f, 58f, 60f, and 62f, of the first separating device 56, the second separating device 58, the third separating device 60, and the fourth separating device 62 respectively, and as more fully described below.

In one example, the pivotable separating mechanism 14 may be pivotable between a first position 92 and a second position 94. When the pivotable separating mechanism 14 is in the first position 92, the pivotable separating mechanism 14 is at a first angle relative to the ground G. In one example, pivotable separating mechanism 14 may be typically parallel with the ground G; however, the pivotable separating mechanism 14 may be configured to be in any suitable orientation. When the pivotable separating mechanism 14 is in the second position 94, the pivotable separating mechanism 14 is at a second angle relative to the ground G. In one example, the second angle may be greater than the first angle. In one example, the first angle and the second angle range from approximately zero degrees to approximately ninety degrees respectively. In another example, the first angle and the second angle range from approximately zero degrees to approximately eighty degrees respectively. In another example, the first angle and the second angle range from approximately zero degrees to approximately seventy degrees respectively. In another example, the first angle and the second angle range from approximately zero degrees to approximately sixty degrees respectively. Although certain ranges of angles have been identified for the first angle and the second angle, the first angle and the second angle may be any suitable angles.

More particularly, when the pivotable separating mechanism 14 is in the first position 92, the first separating device 56, the second separating device 58, the third separating device 60, and the fourth separating device 62 are substantially horizontal relative to the ground G. While the pivotable separating mechanism 14 is in the first position 92, the pallet 78, which is on the platform 96 proximate the removal tool 10, may be positioned such that the first lead deckboard 88 is received within the cavities 56f, 58f, 60f, and 62f and a portion of the pallet 78 below the first lead deckboard 88 is positioned within the free space 65. The first separating device 56, the second separating device 58, the third separating device 60, and the fourth separating device 62 may be positioned such that they are proximate the blocks 80 which contain the fasteners 84 connecting the first lead deckboard 88 to the pallet 78. This is important because pressure is applied proximate the fasteners 84 holding the first lead deckboard 88 to the blocks 80 which is beneficial in removing the first lead deckboard 88 from the blocks 80.

Figure 6B:
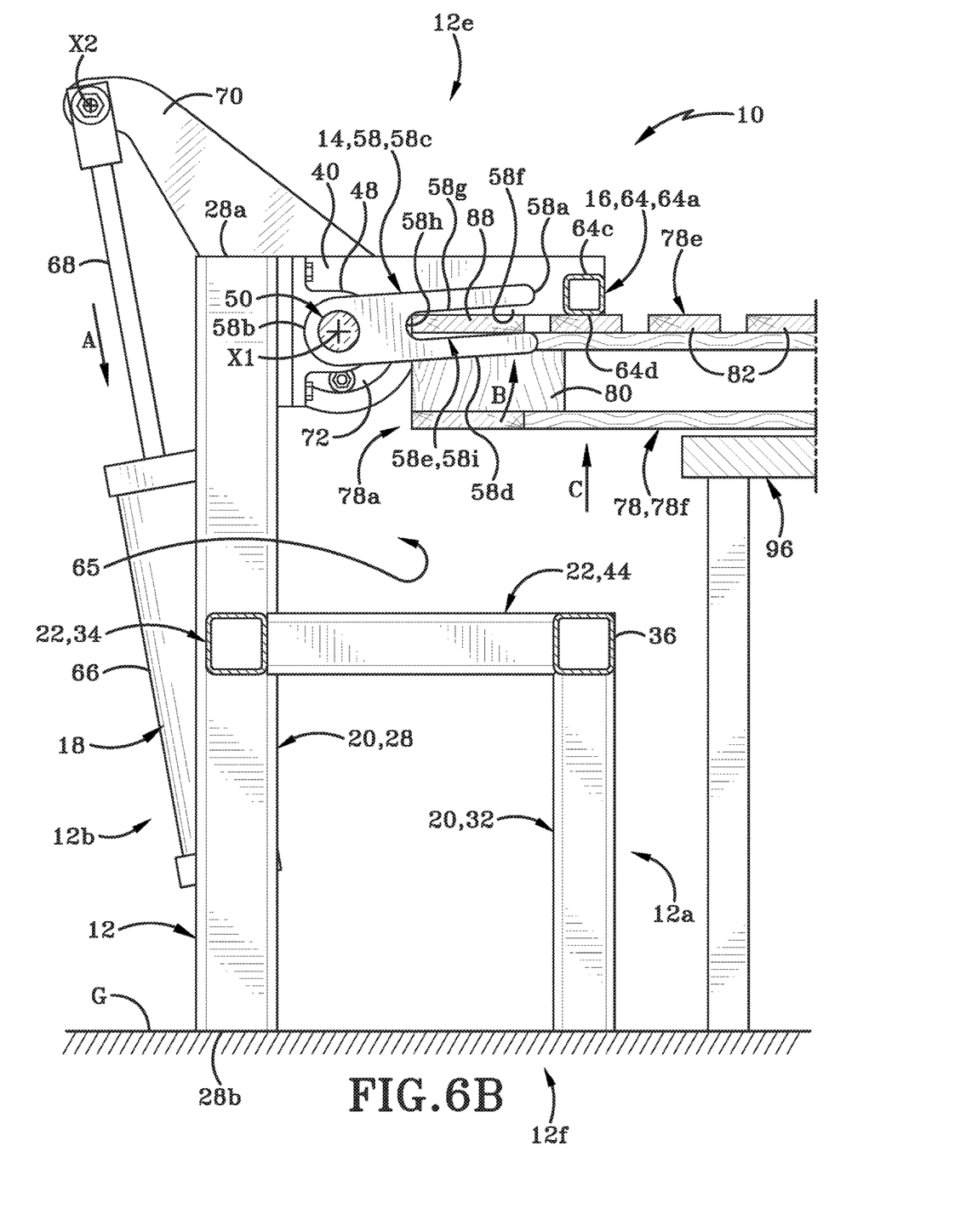
FIG. 6B is an operational view of FIG. 6A showing the removal tool engaging the conventional pallet.
Figure 6C:
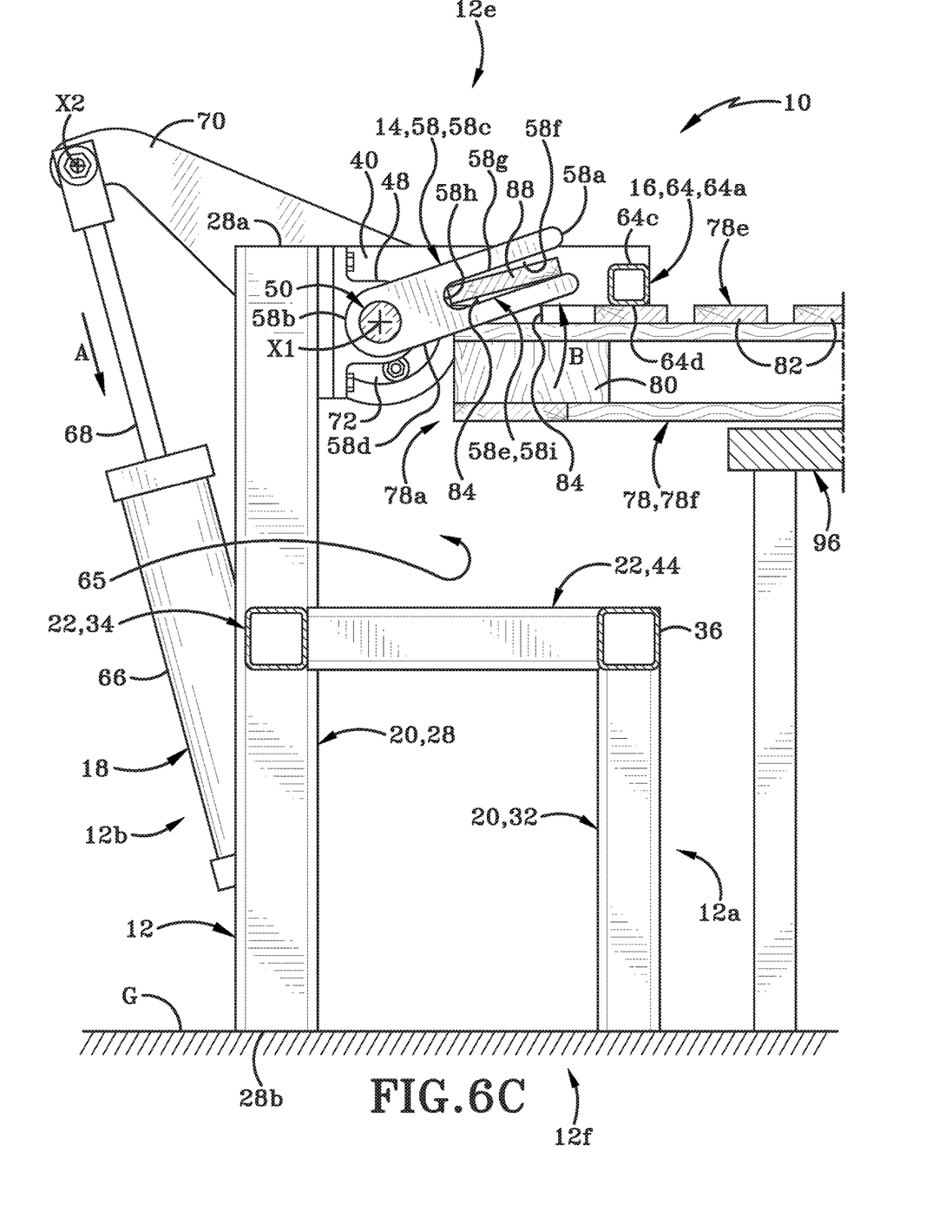
FIG. 6C is an operational view of FIG. 6A showing the removal of fasteners from the conventional pallet.
Figure 6D:
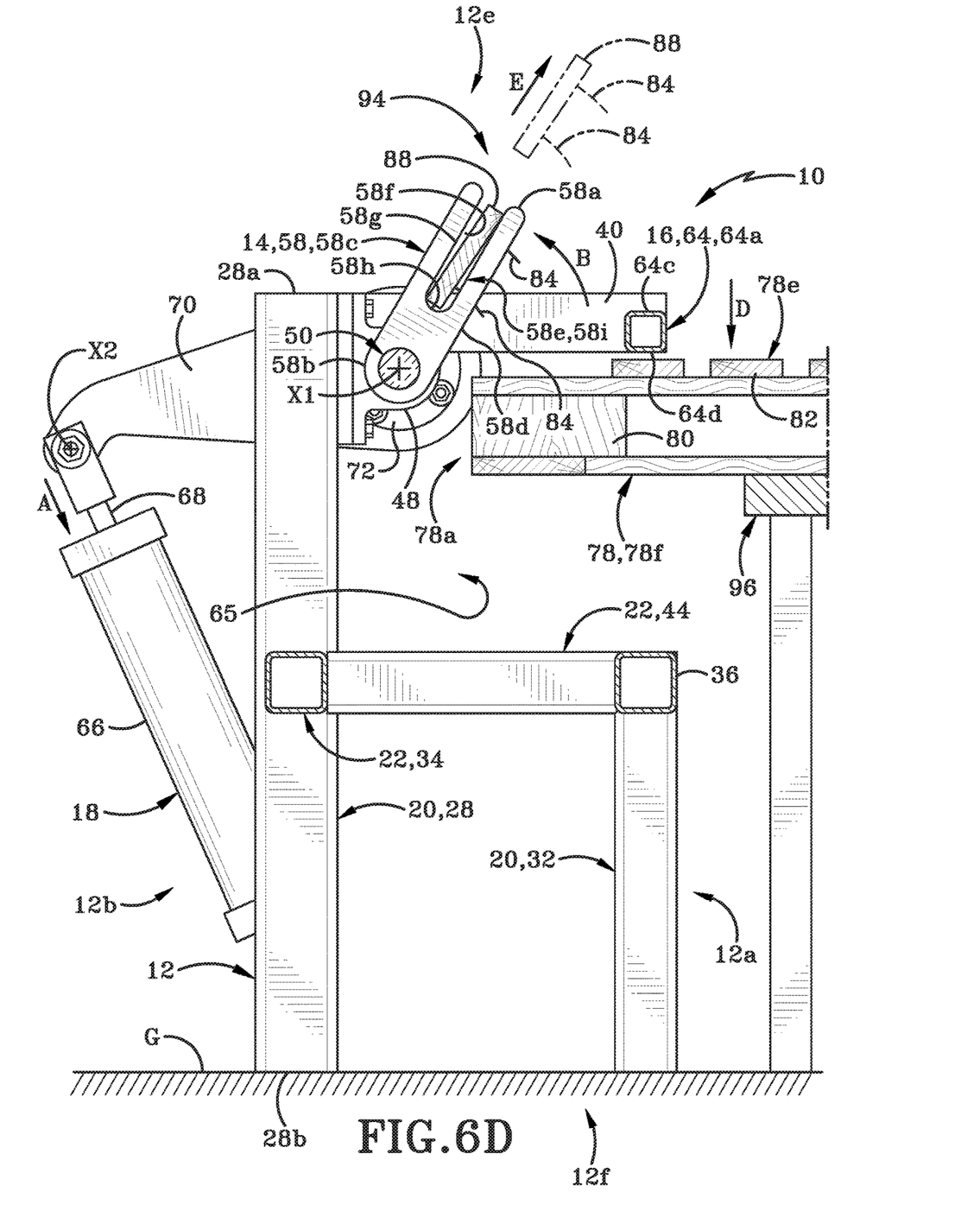
FIG. 6D is an operational view of FIG. 6A showing a lead deckboard being held by the removal tool and the lead deckboard in dashed lines being removed from the removal tool.

The drive mechanism 18 may cause the pivotable separating mechanism 14 to pivot about the first axis X1 from the first position 92 to the second position 94. More specifically, the piston rod 68 is actuated and moves generally vertically downward at an angle as shown by arrow A (FIG. 6B, FIG. 6C, and FIG. 6D). This movement causes the link member 70 to rotate which causes the pivot shaft 50 to rotate in the general direction shown by arrow B (FIG. 6B, FIG. 6C, and FIG. 6D). The inner surfaces 56e, 58e, 60e, and 62e may contact the first lead deckboard 88 applying an upward force on the first lead deckboard 88 which lifts the first lead deckboard 88 and the pallet 78 vertically upwards (as shown by arrow C in FIG. 6B) towards the stopping mechanism 16, which may be the stopping member 64, until at least a portion of the pallet 78 other than the first lead deckboard 88 contacts the stopping mechanism 16. The stopping mechanism 16 applies a vertically downward force on the portion of the pallet 78. While the pallet 78 is prevented from moving vertically upward by the stopping mechanism 16, the upward force provided by the inner surfaces 56e, 58e, 60e, and 62e, against the first lead deckboard 88 may pull the fasteners 84 from the blocks 80 allowing the first lead deckboard 88 to be removed from the pallet 78.

Once the first lead deckboard 88 has been removed, the pallet 78 drops vertically downwards towards the platform 96 as shown by arrow D (FIG. 6D). The first lead deckboard 88 may be retained within the cavities 56f, 58f, 60f, and 62f. The first lead deckboard 88 may be removed from within the cavities 56f, 58f, 60f, and 62f by pulling the first lead deckboard 88 in the general direction shown by arrow E (FIG. 6D). The removed first lead deckboard 88 is shown in dashed lines in FIG. 6D.

Figure 6E:
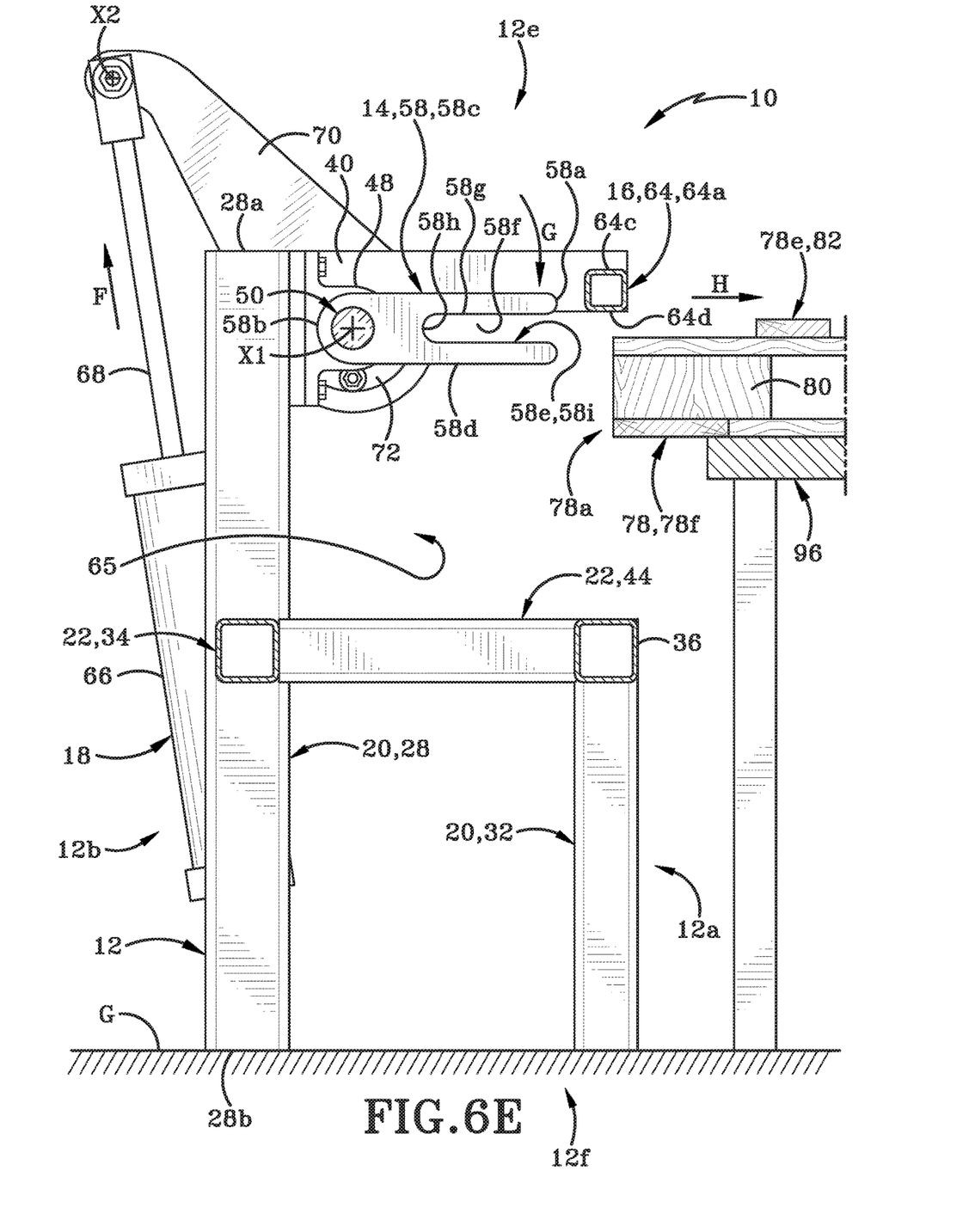
FIG. 6E is an operational view of FIG. 6A showing the removal tool returning to a first position.
Figure 7:
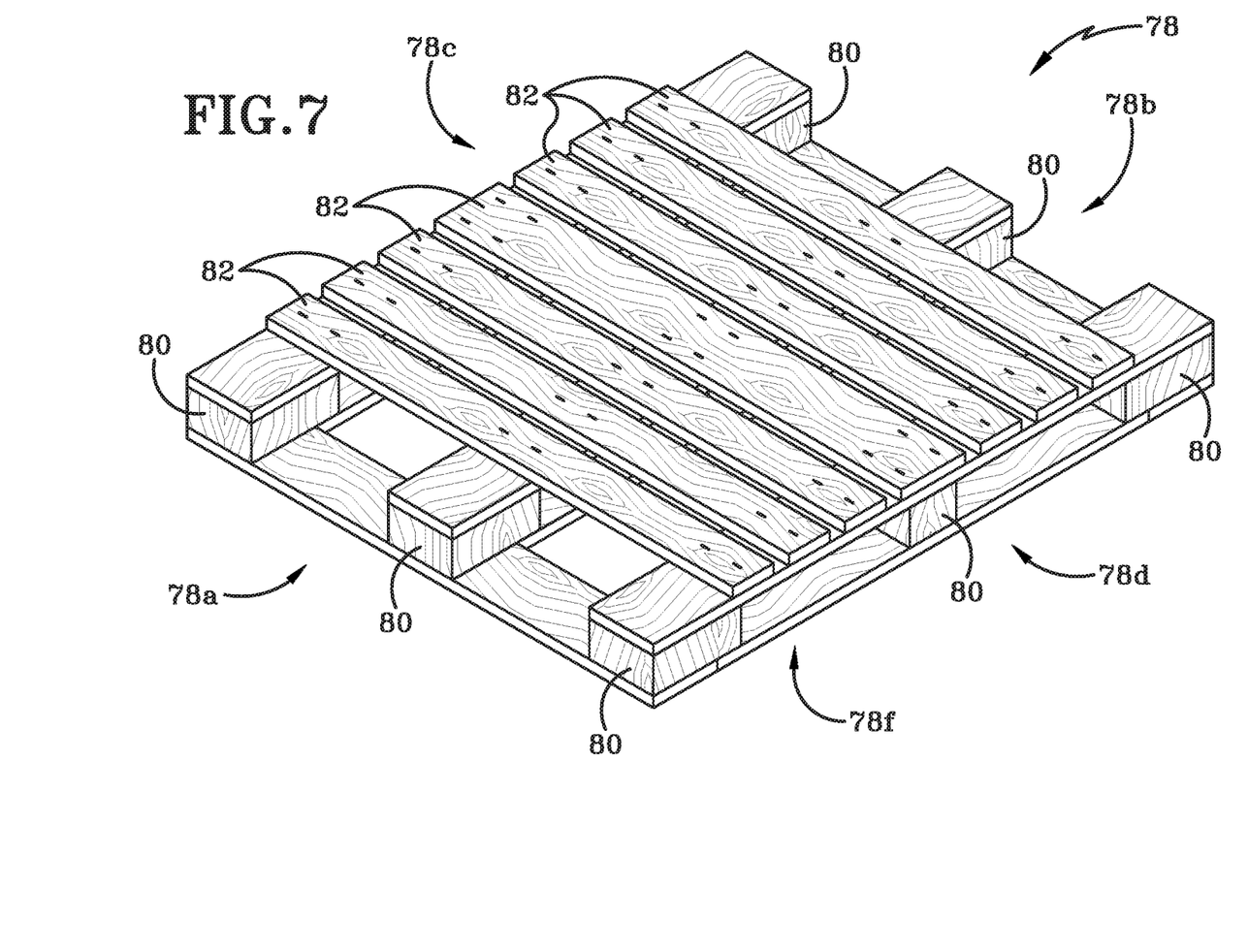
FIG. 7 is an isometric perspective view of the conventional pallet with two lead deckboards removed from the pallet.

The pivotable separating mechanism 14 may pivot from the second position 94 to the first position 92. More specifically, the piston rod 68 is actuated and moves generally vertically upward at an angle as shown by arrow F (FIG. 6E). This movement causes the link member 70 to rotate which causes the pivot shaft 50 to rotate in the general direction shown by arrow G (FIG. 6E). The pallet 78 may then be moved away from the removal tool 10 in the general direction shown by arrow H (FIG. 6E).

The process described above for removing the first lead deckboard 88 may be utilized to remove the second lead deckboard 90 from the pallet 78 in a substantially identical manner. FIG. 8 shows the pallet 78 with the first lead deckboard 88 and the second lead board removed 90.

It is further envisioned that the removal tool 10 may be operated such that the pivotable separating mechanism 14 may be rotated in an opposite direction than the direction of rotation described above. In this example, the pallet 78 may be positioned on a platform 96, such as a table, proximate the front end 12*a* of the frame 12 such that the first lead deckboard 88 is below the blocks 80. In one example, the height of the removal tool 10 may be adjusted, via the adjustable support legs 26, 28, 30, and 32, so that the first lead deckboard 88 and the second lead deckboard 90 are generally aligned to be received within the cavities 56*f*, 58*f*, 60*f*, and 62*f*, of the first separating device 56, the second separating device 58, the third separating device 60, and the fourth separating device 62 respectively, and as more fully described below.

In this example, the pivotable separating mechanism 14 may be pivotable between a first position 92 and a second position (not shown). When the pivotable separating mechanism 14 is in the first position 92, the pivotable separating mechanism 14 is at a first angle relative to the ground G. In one example, pivotable separating mechanism 14 may be typically parallel with the ground G; however, the pivotable separating mechanism 14 may be configured to be in any suitable orientation. When the pivotable separating mechanism 14 is in the second position, the pivotable separating mechanism 14 is at a second angle relative to the ground G. In one example, the second angle may be greater than the first angle. In one example, the first angle and the second angle range from approximately zero degrees to approximately ninety degrees respectively. In another example, the first angle and the second angle range from approximately zero degrees to approximately eighty degrees respectively. In another example, the first angle and the second angle range from approximately zero degrees to approximately seventy degrees respectively. In another example, the first angle and the second angle range from approximately zero degrees to approximately sixty degrees respectively. Although certain ranges of angles have been identified for the first angle and the second angle, the first angle and the second angle may be any suitable angles.

More particularly, when the pivotable separating mechanism 14 is in the first position 92, the first separating device 56, the second separating device 58, the third separating device 60, and the fourth separating device 62 are substantially horizontal relative to the ground G. While the pivotable separating mechanism 14 is in the first position 92, the pallet 78, which is on the platform 96 proximate the removal tool 10, may be positioned such that the first lead deckboard 88 is received within the cavities 56*f*, 58*f*, 60*f*, and 62*f* and a portion of the pallet 78 above the first lead deckboard 88 is positioned within a free space (not shown) above the pivotable separating mechanism 14. The first separating device 56, the second separating device 58, the third separating device 60, and the fourth separating device 62 may be positioned such that they are proximate the blocks 80 which contain the fasteners 84 connecting the first lead deckboard 88 to the pallet 78. This is important because pressure is applied proximate the fasteners 84 holding the first lead deckboard 88 to the blocks 80 which is beneficial in removing the first lead deckboard 88 from the blocks 80.

The drive mechanism 18 may cause the pivotable separating mechanism 14 to pivot about the first axis X1 from the first position 92 to the second position. More specifically, the pivot shaft 50 rotates in a direction that is generally opposite to the direction shown by arrow B (FIG. 6B, FIG. 6C, and FIG. 6D). The inner surfaces 56*e*, 58*e*, 60*e*, and 62*e* may contact the first lead deckboard 88 applying a downward force on the first lead deckboard 88 which lifts the pallet 78 vertically upwards (similar to the direction shown by arrow C in FIG. 6B) towards the stopping mechanism 16, which may be the stopping member 64, until at least a portion of the pallet 78 other than the first lead deckboard 88 contacts the stopping mechanism 16. The stopping mechanism 16 applies a vertically downward force on the portion of the pallet 78. While the pallet 78 is prevented from moving vertically upward by the stopping mechanism 16, the downward force provided by the inner surfaces 56*e*, 58*e*, 60*e*, and 62*e*, against the first lead deckboard 88 may push the fasteners 84 from the blocks 80 allowing the first lead deckboard 88 to be removed from the pallet 78.

Once the first lead deckboard 88 has been removed, the pallet 78 drops vertically downwards towards the platform 96 similar to the direction shown by arrow D (FIG. 6D). The first lead deckboard 88 may drop out of the cavities 56*f*, 58*f*, 60*f*, and 62*f* due to gravity. It is envisioned that a retaining mechanism (not shown) may be added to the removal tool 10 to collect the first lead deckboard 88 after it is dropped from the cavities 56*f*, 58*f*, 60*f*, and 62*f*.

The pivotable separating mechanism 14 may then be moved back to the first position 92. The pallet 78 may then be moved away from the removal tool 10 in a similar direction shown by arrow H (FIG. 6E).

The process described above for removing the first lead deckboard 88 may be utilized to remove the second lead deckboard 90 from the pallet 78 in a substantially identical manner.

Although the operational movement of the piston rod 68 and the link member 70 has been described in a particular manner, it is envisioned that the piston rod 68 and the link member 70 may be configured to operate in any suitable manner. For example, and not meant as a limitation, the piston rod 68 and link member 70 may be configured to operate in opposite directions than described above to accomplish a substantially identical result.

Although the removal tool 10 has been described as removing the first lead deckboard 88 and the second lead deckboard 90 from a pallet containing blocks 80, it is envisioned that the removal tool 10 may be utilized with any suitable pallet, including, but not limited to, a pallet including stringers and deckboards.

It is also further envisioned that the removal tool 10 may be adapted to be utilized with pallets of different dimensions. For example, and not meant as a limitation, a distance between the first side 12*c* and the second side 12*d* of the frame 12 and the spacing between the separating devices 56, 58, 60, and 62, may be adjusted to match the dimensions of particular pallets.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

Additionally, any method of performing the present disclosure may occur in a sequence different than those described herein. Accordingly, no sequence of the method should be read as a limitation unless explicitly stated. It is recognizable that performing some of the steps of the method in an different order could achieve a similar result.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A removal tool comprising:
  a frame adapted to stand on a ground surface, the frame including a first side and a second side defining a longitudinal direction therebetween and a first end and a second end defining a transverse direction therebetween;
  a pivotable separating mechanism having a drive mechanism in operable connection therewith, the pivotable separating mechanism operably engaged with the frame;
  a pivot shaft of the pivotable separating mechanism connected to the first side of the frame by a first mounting bracket and first bearing assembly and connected to the second side of the frame by a second mounting bracket and second bearing assembly, the pivot shaft further connected to the drive mechanism by a link member; wherein the pivot shaft defines a pivot axis;
  at least one separating device of the pivotable separating mechanism carried on the pivot shaft, the at least one separating device having a top portion and a bottom portion defining a U-shaped cavity adapted to receive a portion of a pallet through an open end thereof; wherein the pivot shaft is rotatable about the pivot axis to move the at least one separating device between a first position wherein the U-shaped cavity of the at least one separating device is generally parallel to the ground surface and a second position wherein the open end of the U-shaped cavity of the at least one separating device is angled upward and is positioned above the pivot axis, and a closed end of the U-shaped cavity is below the open end of the U-shaped cavity; and
  a longitudinally extending elongated stopping member extending between the first side and the second side of the frame, the stopping member having a top surface vertically opposite a bottom surface, the stopping member being immovably fixed to the frame, wherein the bottom surface is in a fixed plane relative to the frame and the bottom surface further engages a top surface of the pallet when the pallet is engaged with the at least one separating device of the pivotable separating mechanism.

2. The removal tool of claim 1, wherein when the removal tool is viewed from the first side such that the open end faces the first end of the frame when the pivotable separating mechanism is in the first position, the pivot axis is closer to the second end of the frame than the stopping mechanism.

3. The removal tool of claim 1, wherein a rear end of the at least one separating device is free of any mechanical connection.

4. The removal tool of claim 1, wherein the pivot axis is positioned rearwardly of the cavity.

5. The removal tool of claim 1, wherein when the removal tool is viewed from the first side such that the open end faces the first end of the frame when the pivotable separating mechanism is in the first position, the pivotable separating mechanism moves in a counterclockwise direction when moving from the first position to the second position.

6. The removal tool of claim 1, further comprising: a first support leg of the frame positioned proximate the second end and the first side of the frame; a second support leg of the frame positioned proximate the second end and the second side of the frame; wherein the first support leg is longitudinally spaced from the second support leg; a first support member engaged with the first support leg; wherein the first support member extends in the transverse direction; and a second support member engaged with the second support leg; wherein the second support member extends in the transverse direction and is longitudinally spaced from the first support member; and wherein the stopping member extends longitudinally between and is engaged with the first support member and the second support member.

7. The removal tool of claim 1, wherein when the removal tool is viewed from the first side such that the open end faces the first end of the frame when the pivotable separating mechanism is in the first position, the pivot axis is positioned between the second end of the frame and the stopping member.

8. The removal tool of claim 1, wherein when the pivotable separating mechanism is in the second position, the open end is at an acute angle relative to horizontal.

9. The removal tool of claim 1, wherein when the removal tool is viewed from the first side such that the open end faces the first end of the frame when the pivotable separating mechanism is in the first position, the pivot axis is closer to the second end of the frame than the stopping mechanism.

10. The removal tool of claim 1, wherein when the removal tool is viewed from the first side such that the open end faces the first end of the frame when the pivotable separating mechanism is in the first position, the pivot axis is positioned between the cavity of the at least one separating device and the second end of the frame.

11. The removal tool of claim 1 wherein the at least one separating device and the pivotable separating mechanism are pivotable relative to the frame about the pivot axis between the first position, wherein the U-shaped cavity of the at least one separating device is parallel to the ground surface, and a third position, wherein the U-shaped cavity of the at least one separating device is angled downward and is positioned below the pivot axis.

\* \* \* \* \*